United States Patent [19]

Esslinger et al.

[11] Patent Number: 4,644,755
[45] Date of Patent: Feb. 24, 1987

[54] EMERGENCY REFRIGERANT CONTAINMENT AND ALARM SYSTEM APPARATUS AND METHOD

[75] Inventors: Steven L. Esslinger, Loveland; Donald H. Mohring, Cincinnati, both of Ohio

[73] Assignee: Esswood Corporation, Cincinnati, Ohio

[21] Appl. No.: 651,062

[22] Filed: Sep. 14, 1984

[51] Int. Cl.[4] ............................................. F25B 49/00
[52] U.S. Cl. ......................................... 62/126; 62/129; 62/149
[58] Field of Search ................. 62/125, 126, 129, 127, 62/205, 206, 149; 165/11 R, 70; 236/94

[56] References Cited

U.S. PATENT DOCUMENTS

| | | | |
|---|---|---|---|
| 2,621,487 | 12/1952 | Warren | 62/205 X |
| 3,412,570 | 11/1968 | Pruett, Sr. | 62/129 |
| 4,167,858 | 9/1979 | Kojima et al. | 62/126 |

Primary Examiner—Harry Tanner
Attorney, Agent, or Firm—Frost & Jacobs

[57] ABSTRACT

A refrigeration system leak containment apparatus and method comprises a control circuit and a flow continuity measuring means. The flow measuring means uses an infrared light source and an infrared light detector adjacent a fluid viewing window to detect the continuity of liquid flow as measured by the change in index of refraction through the window. If a test condition is not met, the control circuit activates various peripheral devices which sound an alarm and cause the refrigerant fluid to be contained within a predetermined portion of the refrigeration system.

36 Claims, 6 Drawing Figures

EMERGENCY REFRIGERANT CONTAINMENT AND ALARM SYSTEM APPARATUS AND METHOD

BACKGROUND OF THE INVENTION

1. Field of the Invention

The present invention pertains to the field of refrigeration systems. More particularly, the present invention relates to safety devices operating in a refrigeration system to control the system and alert the owner in the event of refrigeration system breakdown.

2. BACKGROUND INFORMATION

Refrigeration systems have been known for years. An early example of a refrigerating apparatus can be found in U.S. Pat. No. 1,768,602. A typical refrigeration system of this sort uses a compressor which drives a refrigeration fluid through a closed-loop system. In one stage of the system, commonly called the condenser, the refrigerant fluid is pressurized and condensed to a liquid. During this transformation from the gaseous to the liquid state, the refrigerant fluid releases heat to the surrounding environment, often with the aid of a fan and heat dissipation fins or the like.

Cooled to near ambient temperature, the refrigerant fluid continues through the system to a refrigerant metering device such as a thermal expansion valve. The metering device provides a controlled release of the high pressure liquid into a series of coils in the system commonly called the evaporator. Upon passage through the metering device the refrigerant fluid undergoes a change of state from a high pressure liquid to a lower pressure gas. By the time the refrigerant fluid has reached the evaporator end furthest from the expansion valve, the refrigerant fluid is in a gaseous state at a relatively low pressure. The transformation from high pressure liquid to low pressure gas which occurs between the metering device and the far end of the evaporator results in the extraction of thermal energy from the atmosphere surrounding the evaporator. Beyond the evaporator, the refrigerant fluid is drawn into the compressor and begins the cycle anew.

Operation of the compressor of a refrigeration system is typically controlled in one of two ways. In some systems, a thermostat monitors the temperature in the vicinity of the evaporator and cycles the compressor accordingly. In other systems, compressor control is handled by a dual pressure switch which obtain its low pressure reading at the inlet side of the compressor and its high pressure reading at the outlet side. When the pressure at the outlet side reaches an upper limit, the compressor is activated and when the pressure at the inlet side reaches a lower limit it is deactivated.

A significant leak in a large scale refrigeration system can lead to the loss of thousands of dollars worth of refrigerant fluid by evaporation into the atmosphere and can result in an equally costly loss of food stuffs or other refrigerated contents. The nature of a refrigeration system, however, makes detection of system leaks difficult. Changes in ambient temperature and in the behavior of system components result in virtually continuous change in the system pressure and in the fluid flow rate at any particular point in the system. Because these two factors are the principle indicia of fluid condition, the task of leak detection is greatly complicated.

SUMMARY OF THE INVENTION

It is the object of the present invention to provide a simple device which can detect leaks in most refrigeration systems. The present invention seeks to provide a cost effective detection and alarm device which can be installed on most existing and new refrigeration systems. The present invention also provides a device which will rescue and contain the majority of the refrigerant fluid and shut down the refrigeration system in the event a leak is detected.

The present invention detects a refrigerant fluid loss by monitoring the flow of the high pressure liquid refrigerant past a point in the line connecting the liquid receiver to the refrigerant metering device. The characteristics of the fluid flow past such a point are indicative of the quantity of refrigerant fluid in the entire system. Regardless of the quantity of fluid in the refrigeration system, the fluid moving past that point will appear as a random series of liquid segments of fluid separated by gaseous segments of fluid. When the quantity of fluid in the system is low, indicating a leak, the liquid segments become shorter and the gaseous segments become more frequent and larger. Conversely, when the overall fluid quantity is high, the liquid segments become long with few intervening gaseous segments. Thus, the present invention can detect three discrete states of the refrigerant fluid: gas, continuous liquid and liquid with bubbles.

The proportions of gas and liquid moving past a point in the line between the liquid receiver and the metering device vary throughout each compressor cycle. However, if the overall refrigerant fluid quantity in the system remains unchanged, a generalizable pattern of fluid flow past such a point is repeated from cycle-to-cycle. In any given compressor cycle, adequacy of the refrigerant fluid quantity in the system can be demonstrated by the presence of sufficiently long liquid segments moving past a detection point between the liquid receiver and the refrigerant metering device. If an entire compressor cycle is completed without one or more liquid segments of sufficient length, then the system does not have the required quantity of refrigerant fluid.

The present invention monitors the fluid flow past the detection point during the activated portion of each compressor cycle. If no liquid segment of sufficient length flows past that point during that portion of a compressor cycle, the logic circuitry of the present invention concludes that a leak is present in the system and takes steps to contain the refrigerant fluid. Similar signal processing is employed when the present invention is adapted for use on continuous multiple compressor refrigeration systems. On systems where constant refrigerant recirculation is required and one or more compressors never shuts off or are staged electronically or mechanically according to evaporator temperature or individual compressor time usage, the containment system will monitor the liquid line refrigerant level for predetermined time durations provided in the logic circuit by methods known to those skilled in the art.

Upon detection of a leak, the present invention causes a solenoid valve to be closed near the exit side of the system's liquid receiver. Through pressure switch control means, the present invention continues to cycle the compressor until virtually all of the refrigerant fluid has been pumped past a check valve provided as part of the present invention and located near the inlet side of the liquid receiver. In this manner, virtually all of the refrigerant fluid is contained within the liquid receiver, the least likely leak failure point. In addition, any refrigerant in a gaseous state is held in the condensor coil between the check valve at the inlet of the receiver and the compressor discharge valves, the second least likely leak failure point.

The present invention may also be modified to carry out other containment strategies. Furthermore, a variety of additional functions can be executed by the invention upon detection of a leak. For example, the present invention can be made to sound an alarm or provide telephone notification of the refrigerant system malfunction with or without containment of the refrigerant.

DESCRIPTION OF THE PREFERRED EMBODIMENT

Figure 1:
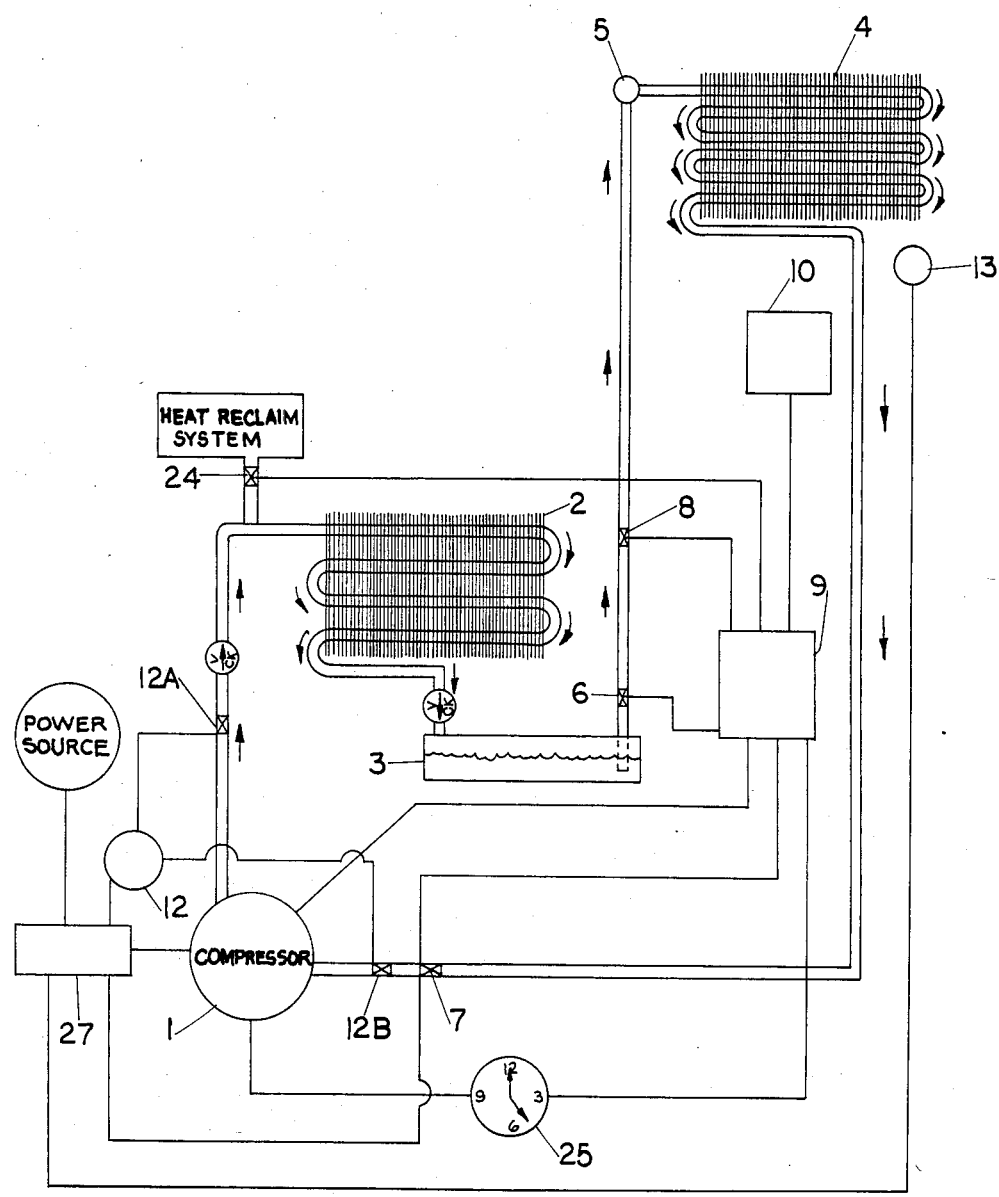
FIG. 1 is a drawing showing the minimum components of a typical refrigeration system and the added components of the present invention.

As described above, a typical refrigeration system consists of a compressor 1, a condenser coil 2, a liquid receiver 3, an evaporator coil 4, and a refrigerant metering device 5, with other elements optional. The present invention is adapted to retrofit such a system. In its preferred embodiment, the present invention utilizes a solenoid valve 6, an existing dual pressure switch 12, an electronic sight glass 8, a control circuit 9 and an alarm or other peripheral device 10.

The auxiliary low pressure switch 7 is retrofitted to an existing system on the low pressure side of the compressor 1. This switch is of the type which can have two separate pressure settings, one at which it will close to complete a circuit and another at which it will open to break a circuit. The solenoid valve 6 of the present invention is retrofitted to a refrigeration system at the outlet of the liquid receiver 3 and the electronic sight glass 8 can be located anywhere between the liquid receiver 3 and the refrigerant metering device 5.

The control circuit 9 receives signals from the electronic sight glass 8 and from the compressor 1. If certain conditions indicating adequacy of refrigerant fluid are not met, the control circuit 9 closes the solenoid valve 6 and alters the compressor controls to contain the refrigerant fluid.

Understanding of the method of operation of the present invention requires knowledge of common control circuit features of a typical refrigeration system. At a minimum, a refrigeration system typically has a dual pressure switch 12, with a high pressure detection point 12A located near the output side of the compressor 1 and a low pressure detection point 12B located near the input side of the compressor 1, and an optional thermostat 13 located near the evaporator coil 4. These control switches are connnected in series at network 27. Unless all of these switches are in a closed position, compressor 1 will not receive power. The dual pressure switch 12 also serves as a safety device, shutting down the compressor 1 in the event the system pressure at 12A becomes dangerously high.

Regardless of whether dual pressure switch 12 is used alone or in combination with thermostat 13, the purpose of the operational control system is to activate the compressor 1 when the evaporator coil 4 temperature rises beyond a predetermined level and to deactivate the compressor 1 when that temperature drops below a predetermined level. A thermostatic control achieves this result by responding to the ambient air temperature in the vicinity of the evaporator coil 4. A dual pressure switch 12 achieves this result by responding to system pressure near the inlet and outlet sides of the compressor 1. That is, when the evaporator coil 4 temperature rises, the gas in the system expands raising the pressure near the compressor 1. Conversely, when the temperature drops, the pressure drops. Thus, in an operating system controlled solely by dual pressure switch 12, the switch 12 would be set to complete the circuit and activate the compressor 1 when the pressure at 12A crosses an upper limit, e.g. 35 p.s.i., and to deactivate the compressor 1 when the pressure at 12B crosses a lower limit, e.g. 20 p.s.i.

When the present invention is installed in a refrigeration system, the operating control system described above is slightly modified to accommodate the auxiliary low pressure switch 7 of the present invention. The existing dual pressure switch 12 is adjusted to deactivate the compressor 1 at a very low pressure, e.g. 0 p.s.i., and to activate the compressor 1 at a slightly higher pressure, e.g. 15 p.s.i. The auxiliary low pressure switch 7 is added to the system in series with the existing switch 12.

In the case of a refrigeration system without a thermostat 13, the auxiliary low pressure switch 7 is set at the proper pressures for normal operation, e.g. activation at 35 p.s.i. and deactivation at 20 p.s.i. With the switches arranged in series in this manner, the auxiliary low pressure switch 7 will dominate the control and maintain normal operation. However, if the containment system of the present invention is activated by a leak, the control circuit 9 will cause the auxiliary low pressure switch 7 to be by-passed and the refrigeration system will be controlled by the original dual pressure switch 12. Because of its adjusted low pressure settings, the existing dual pressure switch 12 will continue to cycle the compressor until the fluid of the system has been contained in receiver 3.

In the case of a thermostatically controlled operating system, the auxiliary low pressure switch 7 of the present invention is set at pressures slightly lower than the corresponding activation and deactivation temperatures of the thermostat 13. With these settings, the auxiliary low pressure switch 7 insures that the compressor 1 will not run indefinitely after the refrigeration system has sprung a leak. In a thermostatically controlled system, it is possible that a leak might occur of such magnitude that compressor operation would not cool the evaporator coil 4 sufficiently to trigger compressor 1 deactivation by the thermostat 13. In such a situation, the control circuit 9 of the present invention would not detect a leak since such a determination effectively occurs only at the end of a compressor cycle—i.e. when the compressor 1 has been deactivated. The auxiliary low pressure switch 7, when set in the manner described, guards against this possibility in a thermostatically controlled refrigeration system since it deactivates the compressor 1 based upon pressure decrease regardless of evaporator coil 4 temperature.

All other features of a thermostatically controlled system are the same as those previously described with a system lacking a thermostat 13. The existing dual pressure switch 12 is adjusted to deactivate the compressor 1 at a very low pressure, e.g. 0 p.s.i., and to activate the compressor 1 at a slightly higher pressure, e.g. 15 p.s.i. When the containment system of the present invention is activated by a leak, the control circuit 9 will cause the auxiliary low pressure switch 7 to be by-passed and the refrigeration system will be controlled by the original dual pressure switch 12 and the thermostat 13. Because of its low pressure settings, the existing dual pressure switch 12, together with the thermostat 13, will continue to cycle the compressor until the fluid of the system has been contained in the receiver 3.

Figure 2:
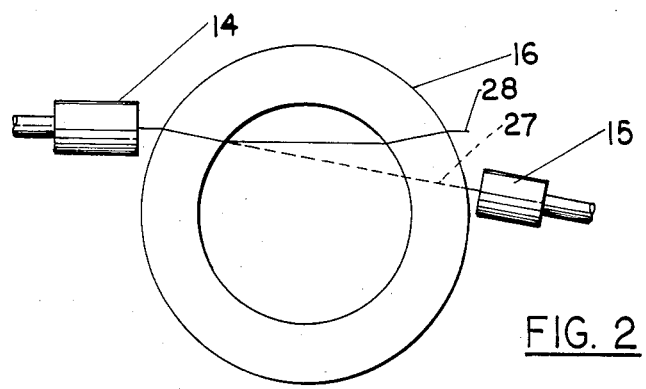
FIG. 2 is a cross section view of a sight glass in its preferred embodiment.
Figure 3:
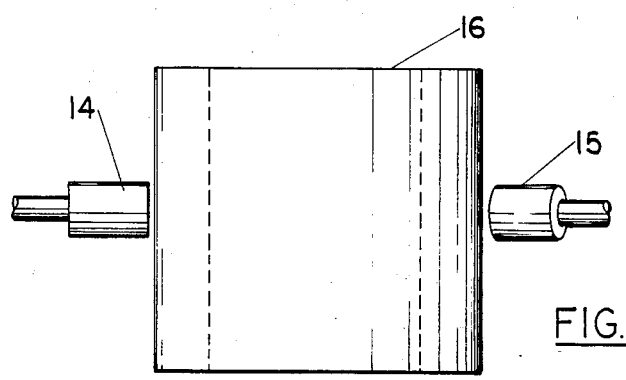
FIG. 3 is a side view of a sight glass in its preferred embodiment.

As mentioned above, the variable which is monitored by the present invention is the continuity of the fluid flow past a single point in the system. This monitoring is accomplished by an electronic sight glass 8, shown in detail in FIGS. 2 and 3. The electronic sight glass consists of a infrared light source 14, an infrared detector 15 and a glass tubing 16 which is inserted into the line of a refrigeration system. The infrared source 14 and infrared detector 15 are positioned on the outside of the glass tubing 16 roughly facing each other. In this manner, the electronic sight glass 8 can detect the presence or absence of liquid within the glass tubing 16 since the path of a light beam changes as it passes the boundary between materials of differing index of refraction. Thus, it is seen in FIG. 2 that the path 27 taken by the infrared light beam when liquid is present within the tube is different than the path 28 taken when liquid is not present. When bubbles are present, the path will fluctuate between 27 and 28. In this manner, a signal from the infrared detector 15 occurs only when liquid is present. When the fluid in the glass tubing 16 is not in liquid form, the infrared detector 15 will not produce a signal. Also, when numerous bubbles are present in the fluid, the signal from the detector 15 will be a pulsating voltage rather than the continuous voltage which results with the presence of liquid.

Figure 4:
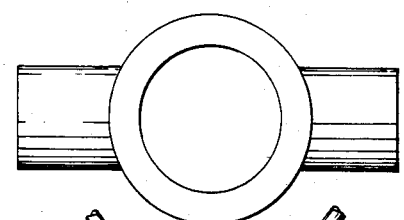
FIG. 4 is a top view of a sight glass in an alternate embodiment.
Figure 5:
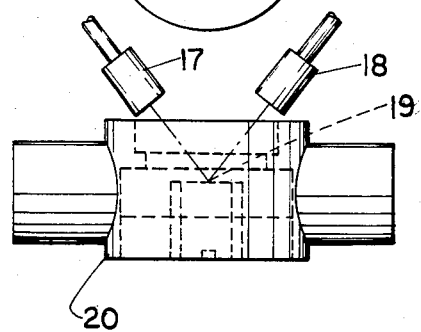
FIG. 5 is a side view of a sight glass in its preferred embodiment.

FIGS. 4 and 5 show an alternate embodiment of the electronic sight glass. This embodiment more closely resembles the standard sight glass found on many refrigeration systems. In this embodiment, the infrared source 17 and detector 18 are located adjacent each other and both are aimed towards a reflective surface 19 provided within the sight glass 20. This arrangement operates on the same principles as the preferred embodiment described above, relying upon the change in index of refraction to alter the light beam path and change the signal produced by the infrared detector 18.

Figure 6:
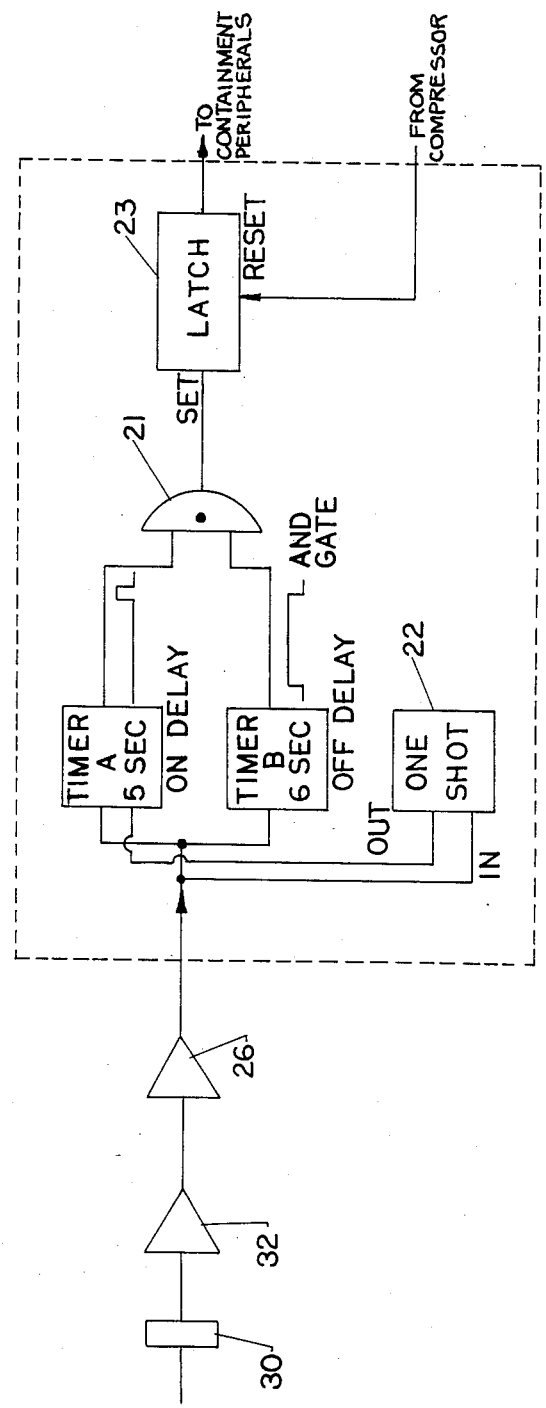
FIG. 6 is a block diagram of the logic circuit portion of the control circuit of the present invention.

As mentioned above, the present invention monitors the length of liquid segments passing the electronic sight glass 8 of FIG. 1. The signal from the infrared detector is processed to determine the presence of gas, liquid or bubbles and is amplified and conducted to a control circuit 9. A logic portion of the control circuit 9 is illustrated in FIG. 6. The electronic sight glass is represented at 30. When liquid is present at the detection point, the electronic sight glass 30 generates a signal. Amplifier 32 amplifies that signal so that it will not be lost to background noise and filters out the pulsating signal caused by bubbles in the line. A comparator 26 outputs a signal, only if the input signal it receives meets a predetermined threshold. At the beginning of the circuitry cycle, a signal from comparator 26 triggers timer A. If uninterrupted, timer A will itself create an output signal after five seconds. At the same time, the signal from the comparator 26 triggers timer B. Timer B then emits a signal for a duration of six seconds. The signals from timer A and B are fed to an AND gate 21 which will produce an output signal only if a signal is received simultaneously from both timers A and B. Also contained in the logic circuit is a "one shot" 22. If the signal from the comparator 26 stops indicating the end of a liquid segment, the "one shot" 22 emits a pulse to cancel timer A. Through the cooperation of these circuitry components, the AND gate 21 will not produce an output signal to set latch 23 in any given compressor cycle unless a liquid segment of at least five seconds duration moves past the electronic sight glass 24. The use of five seconds as a test interval is for purposes of illustration only and the present invention can be adjusted to operate over a wide variety of test intervals.

If the test interval condition is satisfied, the latch 23 is set by a latchup signal from AND gate 21. When the compressor 1 reaches the end of a cycle, latch 23 is in a hold condition. In this manner, the compressor 1 proceeds to cycle in its normal fashion controlled either by the thermostat 13 or the auxiliary low pressure switch 7. When the compressor 1 begins its next cycle of operation, a signal from the compressor 1 resets the latch 23 and starts the circuitry sequencing from the beginning.

Similar signal processing is employed when the present invention is adapted for use on continuous multiple compressor refrigeration systems. On systems where constant refrigerant recirculation is required and one or more compressors never shuts off or are staged electronically or mechanically according to evaporator temperature or individual compressor time usage, the containment system will monitor the liquid line refrigerant level for predetermined time durations provided in the logic circuit by methods known to those skilled in the art.

During any given cycle of the compressor 1, it may occur that the five second liquid segment standard of the logic circuit of FIG. 6 is not satisfied. If that occurs, the latch 23 does not receive a latchup signal and instead, a separate sequence of operations is initiated. The auxiliary low pressure switch 7 is by-passed by control circuit 9 leaving the system to cycle under the control of the existing dual pressure switch 12 and, where applicable, the thermostat 13. The solenoid valve 6 at the outlet of the liquid receiver 3 is closed and an alarm circuit 10 or other optional device is activated.

In addition, in refrigeration systems with certain added features, additional steps are taken by the control circuit 9 of the present invention. In a refrigeration system containing a heat reclaim system as shown in FIG. 1, the control circuit 9 will cause a solenoid valve 24 to open causing the heat reclaim system to drain its refrigerant fluid. In this manner, the refrigerant fluid of the entire refrigeration system can be directed to the liquid receiver.

Special arrangements are also made in a system containing an automated defrost control 25 as shown in FIG. 1. In normal operation, the defrost device 25 deactivates the compressor 1 at predetermined intervals. It is possible that this deactivation could occur immediately after the compressor was activated in a new cycle. In such a case the control circuit 9 as described above would conclude that the refrigeration system lacked adequate refrigerant fluid and would initiate the containment strategy. To guard against this possibility, the control circuit 9 of a refrigeration system containing a defrost mechanism must include circuitry which will reset the logic circuit of FIG. 6 to the beginning of its test cycle in the event the compressor deactivation was caused by the defrost mechanism. With such circuitry in place, it is also necessary that the timer of the defrost device 25 be halted when the control circuit 9 of the present invention legitimately initiates the containment strategy. Otherwise, the defrost device 25 would send a signal which would reset the latch 23 and the logic circuit of FIG. 6 and abort the properly initiated containment strategy. To avoid this possibility, in a refrigeration system which includes a defrost device 25, the defrost timer motor is deactivated by the control circuit 9 when containment is initiated.

Once the control circuit 9 has made the changes identified above in connection with containment strategy, the refrigeration system will continue to operate under the control of the original dual pressure switch 12 and, where applicable, the thermostat 13 until the refrigerant fluid has been contained. While the various steps of the containment strategy outlined above describe the preferred embodiment, other actions by the control circuit 9 are possible. Also, it will be obvious to one skilled in the art that the precise control circuit logic employed to achieve the containment strategy could be easily altered or achieved by a digital computer or other methods and apparatus.

What is claimed is:

1. A method of detecting refrigerant leaks in a vapor compression refrigeration system having a circulating refrigerant, comprising the steps of:
    (a) monitoring the flow of refrigerant past a detection location and producing a signal indicative of whether the refrigerant is in a gaseous, liquid, or liquid with bubbles state;
    (b) determining whether the refrigerant flowing past the detection location during a predetermined monitoring period includes any liquid segments having a predetermined length;
    (c) producing a control signal indicative of whether any liquid segments exceeding said predetermined length flow past the detection location during the predetermined monitoring period; and
    (d) controlling the refrigeration system in response to the control signal to selectively contain the refrigerant within a predetermined space.

2. A method according to claim 1 wherein said controlling step includes closing a valve in said refrigeration system adjacent an output of a liquid receiver.

3. A method according to claim 1 wherein said controlling step includes converting an operating control system of said refrigeration system from an original operating control means to an auxiliary operating control means.

4. A method according to claim 3 wherein said controlling step further includes running said refrigeration system until substantially all of said refrigerant fluid is contained by said liquid receiver.

5. A method according to claim 1 wherein said monitoring step includes measuring the refractive index of the refrigerant flowing past the detection location.

6. A method according to claim 5 wherein said controlling step includes closing a valve in said refrigeration system adjacent an output of a liquid receiver.

7. A method according to claim 5 wherein said controlling step includes converting an operating control system of said refrigeration system from an original operating control means to an auxiliary operating control means.

8. A method according to claim 7 wherein said controlling step further includes running said refrigeration system until substantially all of said refrigerant fluid is contained by said liquid receiver.

9. A method according to claim 1 wherein said monitoring step includes projecting a light beam through said fluid of said refrigeration system, and detecting the orientation of said light beam at some point beyond the boundaries of said fluid.

10. A method according to claim 9 wherein said controlling step includes closing a valve in said refrigeration system adjacent an output of a liquid receiver.

11. A method according to claim 9 wherein said controlling step includes converting an operating control system of said refrigeration system from an original operating control means to an auxiliary operating control means.

12. A method according to claim 11 wherein said controlling step further includes running said refrigeration system until substantially all of said refrigerant fluid is contained by said liquid receiver.

13. A method according to claim 9 wherein said controlling step includes deactivating a defrost timer when the fluid of said refrigeration system is below a predetermined threshold.

14. A method according to claim 9 wherein said containing step includes opening a heat reclaim valve when the fluid of said system is below a predetermined threshold.

15. In a vapor compression refrigeration system having a recirculating refrigerant flowing through the system, an apparatus for measuring the adequacy of the refrigerant fluid quantity, comprising:
    (a) means for sensing the characteristics of the refrigerant flowing past a detection location of the refrigeration system and producing a signal indicating whether the refrigerant flowing past the detection location is in a liquid, liquid with bubbles, or gaseous state;
    (b) control means responsive to the signal produced by the sensing means for producing a control signal indicative of whether the refrigerant flowing past the detection location during a predetermined monitoring period has a continuous liquid segment of a predetermined length; and
    (c) means responsive to said control signal for controlling the refrigeration system and containing the refrigerant within a predetermined space whenever a continuous liquid refrigerant segment of the predetermined length does not flow past the detection location within the predetermined monitoring period.

16. An apparatus according to claim 15 wherein said containing means comprises an electromechanical valve installed near an outlet of a liquid receiver of said refrigeration system.

17. An apparatus according to claim 15 further comprising:
    an original operating control means;
    an auxiliary operating control means; and
    means responsive to said control signal for converting said refrigeration system from said original operating control means to said auxiliary operating control means.

18. An apparatus according to claim 17 wherein said auxiliary operating control means comprises at least one pressure sensitive switch.

19. An apparatus according to claim 15 further including means responsive to said control signal means for deactivating a defrost timer.

20. An apparatus according to claim 15 further including means responsive to said control signal means for opening a heat reclaim valve.

21. An apparatus according to claim 15 wherein said sensing means includes means for measuring the refractive index of the refrigerant flowing past the detection location.

22. An apparatus according to claim 21 wherein said containing means comprises an electromechanical valve installed near an outlet of a liquid receiver of said refrigeration system.

23. An apparatus according to claim 21 further comprising:
an original operating control means;
an auxiliary operating control means; and
means responsive to said control signal for converting said refrigeration system from said original operating control means to said auxiliary operating control means.

24. An apparatus according to claim 23 wherein said auxiliary operating control means comprises at least one pressure sensitive switch.

25. An apparatus according to claim 21 further including means responsive to said control signal means for deactivating a defrost timer.

26. An apparatus according to claim 21 further including means responsive to said control signal means for opening a heat reclaim valve.

27. An apparatus according to claim 15 wherein said sensing means comprises:
a means for viewing the flow of said fluid at said detection location;
a light source adjacent said viewing means and directed toward said fluid; and
a light detector positioned to respond to the difference in light paths associated with the liquid and gaseous states of said fluid.

28. An apparatus according to claim 15 wherein said control means includes a logic circuit comprising:
a delayed output timer responsive to said refrigerant state signal producing means;
a fixed duration timer responsive to said refrigerant state signal producing means;
an AND gate responsive to a simultaneous signal from said delayed output timer and said fixed duration timer for producing a signal; and
means responsive to said AND gate signal for initiating said containing means.

29. An apparatus according to claim 28 wherein said containing means comprises an electromechanical valve installed near an outlet of a liquid receiver of said refrigeration system.

30. An apparatus according to claim 28 further comprising:
an original operating control means;
an auxiliary operating control means; and
means responsive to said control signal for converting said refrigeration system from said original operating control means to said auxiliary operating control means.

31. An apparatus according to claim 30 wherein said auxiliary operating control means comprises at least one pressure sensitive switch.

32. An apparatus according to claim 28 further including means responsive to said control signal means for deactivating a defrost timer.

33. An apparatus according to claim 28 further including means responsive to said control signal means for opening a heat reclaim valve.

34. An apparatus according to claim 21 wherein said control means includes a logic circuit comprising:
a delayed output timer responsive to said refrigerant state signal producing means;
a fixed duration timer responsive to said refrigerant state signal producing means;
an AND gate responsive to a simultaneous signal from said delayed output timer and said fixed duration timer for producing a signal; and
means responsive to said AND gate signal for initiating said containing means.

35. An apparatus according to claim 27 wherein said control means includes a logic circuit comprising:
a delayed output timer responsive to said refrigerant state signal producing means;
a fixed duration timer responsive to said refrigerant state signal producing means;
an AND gate responsive to a simultaneous signal from said delayed output timer and said fixed duration timer for producing a signal; and
means responsive to said AND gate signal for initiating said containing means.

36. An apparatus according to claim 35 further comprising:
an original operating control means;
an auxiliary operating control means; and
means responsive to said control signal for converting said refrigeration system from said original operating control means to said auxiliary operating control means.

* * * * *